United States Patent
Collins

(10) Patent No.: US 7,809,731 B2
(45) Date of Patent: Oct. 5, 2010

(54) SYSTEM AND METHOD FOR REORDERING A RESULT SET COPYRIGHT NOTICE

(75) Inventor: Robert J. Collins, Carlsbad, CA (US)

(73) Assignee: Yahoo! Inc., Sunnyvale, CA (US)

(*) Notice: Subject to any disclaimer, the term of this patent is extended or adjusted under 35 U.S.C. 154(b) by 559 days.

(21) Appl. No.: 11/264,741

(22) Filed: Oct. 31, 2005

(65) Prior Publication Data

US 2007/0027869 A1     Feb. 1, 2007

Related U.S. Application Data

(60) Provisional application No. 60/703,904, filed on Jul. 29, 2005.

(51) Int. Cl.
G06F 7/24     (2006.01)
(52) U.S. Cl. ..................................... 707/748
(58) Field of Classification Search ................. 707/3, 707/748, 752, 754
See application file for complete search history.

(56) References Cited

U.S. PATENT DOCUMENTS

| 5,826,260 | A | * | 10/1998 | Byrd et al. | 707/5 |
| 7,440,968 | B1 | * | 10/2008 | Oztekin et al. | 707/102 |
| 2002/0120629 | A1 | * | 8/2002 | Leonard | 707/100 |
| 2004/0002973 | A1 | * | 1/2004 | Chaudhuri et al. | 707/7 |
| 2004/0138946 | A1 | * | 7/2004 | Stolze | 705/14 |
| 2006/0265399 | A1 | * | 11/2006 | De Filippi | 707/10 |

* cited by examiner

Primary Examiner—James Trujillo
Assistant Examiner—Fatima P Mina
(74) Attorney, Agent, or Firm—Ostrow Kaufman & Frankl LLP; Seth H. Ostrow

(57) ABSTRACT

The present invention relates to systems and methods for the reordering of an ordered result set using a weight associated with a query and values associated with items in a result set. The method of the present invention comprises receiving a query and generating a result set comprising content items with associated values. The result set is given an initial ordering based upon the context of the query received. A weight is retrieved corresponding to the received query. Weighted values are assigned to one or more items in the result set by traversing the result set and calculating a weighted value using the weight associated with the received query and the values associated with the items in the result set. The result set is reordered according to the weighted values in descending order. The reordered result set is delivered to the user or client device initiating the query.

20 Claims, 3 Drawing Sheets understood# SYSTEM AND METHOD FOR REORDERING A RESULT SET COPYRIGHT NOTICE

RELATED APPLICATIONS

This application claims priority to U.S. Provisional Patent Application Ser. No. 60/703,904, entitled "SYSTEM AND METHOD ALLOWING INFORMATION PROVIDER ACCESS TO A NETWORKED DATABASE SEARCH SYSTEM," filed on Jul. 29, 2005, the disclosure of which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention generally provides methods and systems for facilitating the ordering of a result set. More specifically, the present invention provides methods and systems that facilitate the search, retrieval and ordering of items of content and links to content in a result set, and a weighted reordering of the result set using values associated with each item in the result.

Search engines for receiving a query and generating a ranked result set are known to those of skill in the art. Client devices, communicatively coupled to a network such as the Internet, are able to access various search engines to execute searches. A user of a client device may submit a search query comprising one or more terms to a search engine, which retrieves a result set responsive to the search terms provided by a user. The search engine displays the result set that it generates to a user who may then select or view items in the result set.

Result sets generated in response to a user's query may be comprised of references to web sites, images, advertisements, etc., which are often ranked according to a predetermined algorithm. For example, a result set comprising references or links to web sites may be ranked according to an algorithm that determines the frequency in which a query term appears in a given web site. Current ordering methodologies, however, are tailored to provide users with results that are ordered according to their relevancy with respect to a given query. Such ordering methods order results, such as web sites or advertisements, in descending order with the result most closely related to a user's query ranked first. Ordering results in a result set in descending order with respect to relevancy is based upon the assumption that a result ranked first in a result set displayed to a user is more likely to be viewed or selected than a result ranked second, third, etc. However, while such ordering methods are capable of providing users with results which are ordered so as to provide a user with the most relevant links to content, these methods fail to take into account the profit interests and needs of the businesses providing the search engine and the ranked results.

A search engine may generate profit when a given result in a result set is selected by a user or displayed to a user in response to a search query. For example, advertisers may pay a predetermined amount to have banners, images, or other advertisements displayed to users in response to a given query. Search engines may also charge advertisers for each advertisement selected by a user or delivered to a user.

When a search engine receives a user's query, the search engine retrieves the advertisements most pertinent to the given query. The search engine may display the advertisements ordered according to each advertisement's relevancy with respect to the query received. However, different advertisements may be more or less profitable for a search engine to display as the amount paid by each advertiser for displaying an advertisement varies. Furthermore, an advertisement or other item of content ranked and displayed first in a result set is more likely to be selected by a given user than an item ranked second, third, etc. Therefore, when determining an ordering for results comprising a result set, search engine owners or operators may desire to order the results using methods which increase the likelihood that the most profitable items are selected.

Current methods and systems for ranking results in a result set fail to take into account both the relevancy and profitability of an ordered result set. In order to overcome shortcomings associated with existing ordering techniques for ordering a result set, embodiments of the present invention provide systems and methods for initially ordering a result set based upon relevancy with respect to a given query, and then reordering the ordered result set based upon a weighted value assigned to one or more items in a result set.

SUMMARY OF THE INVENTION

The present invention is directed towards systems and methods for the reordering of an ordered result set based upon values associated with items in a result set and a weight associated with a received query. According to one embodiment, the invention provides a system and method for reordering an ordered result set. According to the present embodiment, the method comprises retrieving content comprising a result set corresponding to a search query and determining an initial ordering for the result set. A weight associated with the received query is used in conjunction with values associated with items in the result set to produce a weighted value for one or more items in the result set. The result set is reordered using the weighted values generated for the one or more items.

According to one embodiment of the invention, content in a result set comprises advertisements that correspond to the query received. Content items may further comprise links to advertisements. Determining the initial ordering for the result set may comprise identifying items in the result that are to be ranked in fixed locations within the result set or determining items in the result set that contain the exact terms of the received query. Determining the initial ordering of the result set may further comprise ordering items randomly, according to geographic location, or according to category information. Reordering may apply to those items in the result set that are to be ranked in fixed locations or those items in a result set that are exact matches, e.g., contain the exact terms of the received query.

According to one embodiment of the invention, a value is associated with each item of content. The value associated with an item of content in the result set may be an indication of profit, the frequency with which an item is selected by a user, the price charged to a provider of content in the result set, etc.

Associated with each query is a weight used to create one or more weighted value items in the result set. According to one embodiment of the invention, a weighted value is produced for one or more items in the result by traversing the result set and calculating the product of the value associated with an item in the result set and the weight associated with a given query.

Producing the weighted value for the one or more content items in the result set comprises traversing the ordered result set and selecting the values associated with one or more items of content in the result set. The weight associated with the received query is used in conjunction with a value associated with an item of content to produce a weighted value. The result set is reordered by traversing the result set and reordering the one or more items in the result with weighted values in descending order.

The invention is also directed towards a system for reordering an ordered result set using a weight associated with a given query and values associated with items in a result set. According to one embodiment, the system of the present invention comprises a content manager operative to receive a query and retrieve content in response to the received query. According to another embodiment, the system of the present invention comprises an indexing component operative to receive a query and retrieve links to content in response to the received query.

A weight component is operative to retrieve the result set and apply a weight associated with the query received to values associated with one or more items in the result set. The weight component is operative to calculate a weighted value for one or more items in the result set.

A reorder component is operative to traverse the result set and reorder the one or more weighted value items in the result set. The reorder component reorders the one or more weighted items according to weighted value in descending order.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
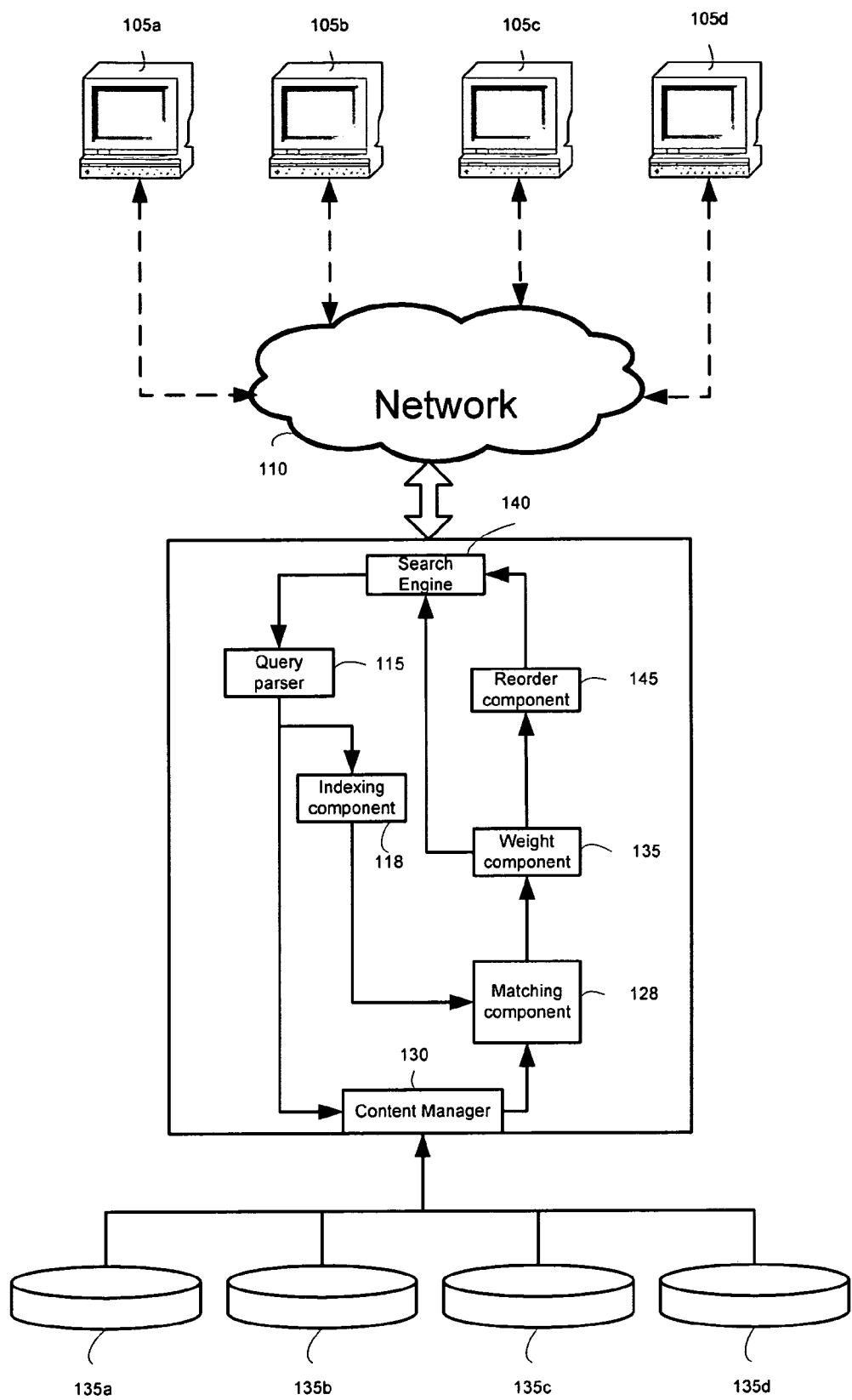
FIG. 1 is a block diagram presenting a system for ordering a result set with respect to relevancy in response to a given query and reordering items comprising the result set with respect to values and a weights.

FIG. 1 presents a block diagram depicting one embodiment of a system for retrieving and ordering content in response to a query. According to the embodiment of FIG. 1, client devices 105a, 105b, 105c and 105d are communicatively coupled to a network 110 which may include a connection to one or more local and/or wide area networks, such as the Internet. A client device 105a, 105b, 105c and 105d may be any device that allows for the transmission of search requests to a search engine 140, as well as receipt of ranked result sets from a search engine 140. According to one embodiment of the invention, a client device 105a, 105b, 105c and 105 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Using the network 110, a client device 105a, 105b, 105c or 105d is capable of accessing a search engine 140. A client device 105a, 105b, 105c or 105d may submit a query, comprising one or more terms, to the search engine 140. The search engine 140 receives the query from the client device(s) 105a, 105b, 105c or 105d and delivers the query to a query parser 115.

According to one embodiment of the invention, the query parser 115 parses the query and delivers the query to a content manager 130. The content manager 130 retrieves content from content sources 135a, 135b, 135c and 135d falling within the scope of the query. Content sources 135a, 135b, 135c and 135d may be accessible memory structures such as a database, CD-ROM, tape, digital storage library, etc. Content sources 135a, 135b, 135c and 135d may be implemented as databases or any other type of storage structures capable of providing for the retrieval and storage of a variety of data types. Content sources 135a, 135b, 135c and 135d are communicatively coupled to the content manager 130 for receiving requests for content and retrieving a variety of content in response to a query to generate a result set.

Alternatively, or in conjunction with the foregoing, the parsed query is delivered to an indexing component 118. The indexing component 118 communicates with an index (not pictured) that defines a structure for content that allows for the location and retrieval of the content. According to one embodiment of the invention, the indexing component 118 communicates with an index of word-location pairs that allows the indexing component 118 to determine specific items of content in response to a query from a client device 105a, 105b, 105c and 105d. According to another embodiment of the invention, the index maintains links or references to content. Exemplary methods for indexing information are described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety.

The content manager 130 or indexing component 118 delivers the result set to the matching component 128. The content retrieved by the indexing component 118 or content manager 130 comprises a result set falling within the scope of the query received from a client device 105a, 105b, 105c and 105d. Content comprising a result set includes, but is not limited to, files, images, and links to content.

The matching component 128 stores information indicating the content items that are to be placed in fixed positions within a result set in response to a given query. A provider of content may purchase a fixed location within a result set in which content is to be delivered in response to a user query, thereby increasing the likelihood that the provider's content is seen or selected by a user. The search engine 140 may determine the amount to charge for a location in an ordered result set corresponding to a given query. When the search engine 140 receives a query, the matching component 128 determines whether any providers of content in the result set have purchased fixed locations corresponding to terms in the respective query. If a fixed location is identified for an item of content, the matching component 128 annotates the item of content to indicate that the item of content is to appear in the fixed location in a result set selected and purchased by the content provider. All fixed locations are identified by the matching component 128 with respect to the query received by the search engine 140.

The matching component 128 may perform an additional search of the content to determine items of content in the result set which "exactly match" the query received by the search engine 140. An exact match search identifies items in the result set that contain the exact query terms received from a client device. Items in the result set which are identified as exact matches by the matching component 120 are annotated as such. According to one embodiment of the invention, an exact match comprises an item in the result set that contains all of the terms comprising a query in the respective order of the query terms as received from a client device 105*a*, 105*b*, 105*c* and 105*d*. According to another embodiment of the invention, an exact match comprises an item in the result set which contains all of the terms comprising a query in any order. Those of ordinary skill in the art recognize numerous methods for determining an exact match with respect to a given query and an item in a result set.

The annotations for items of content indicating a fixed position within a result set and the annotations for items of content indicating an exact match provide for an ordering of the items in a result set based upon the context of a user's query. The remaining content items in a result set not annotated with fixed position information or designated as exact matches may be ordered according to a broad match ordering algorithm. According to one embodiment of the invention, a broad match ordering algorithm uses category information to order the remaining items in a result set. For example, the algorithm may designate items in the result set as falling within the scope of a given category or topic. The designated category information is used to order items in the result set not designated as exact matches or annotated with fixed position information. According to another embodiment of the invention, a broad match ordering algorithm orders items in the result set with respect to popularity. According to yet another embodiment of the invention, a broad match ordering algorithm orders items in the result set randomly.

The ordered result set is delivered to the weight component 135. The weight component 135 is operative to receive and store a weight associated with a given query. The system of the present invention may define a weight for each query, for categories of queries, etc. Upon receiving an ordered result set, the weight component 135 determines whether a weight is associated with the query and result set received. If a weight is not associated with the query received, the ordered result set is delivered to the search engine 140 and displayed on a client device 105*a*, 105*b*, 105*c* and 105*d*. If the weight component 135 determines that a weight exists for the query received, the weight component uses the weight to create a result set of items with weighted values.

A value may be associated with each item in the result set retrieved by the indexing component 118 or content manager 130. The value corresponding to each item in the result set is used in conjunction with the retrieved weight to create a weighted value for the one or more items in the result set not annotated with fixed position information or designated as an exact match. The weight component traverses the ordered result set, selecting the one or more items in the result set not designated as an exact match or annotated with fixed position information. Using the weight associated with the query received from a client device 105*a*, 105*b*, 105*c* and 105*d* and the values associated with each item in the result set, the weight component calculates a weighted value for the one or more items in the result set not designated as an exact match or annotated with fixed position information.

The result set is delivered to the reorder component 145 which traverses the result set to read the weighted values associated with items not identified as fixed position items or designated as exact matches. The reorder component 145 reorders the result set in descending order based upon the weighted values assigned to items in the result set. The reordered result set is delivered to the search engine 140, which transmits the result set to the client device that initiated the query for viewing the reordered result set. Results are displayed wherein items annotated with fixed position information are displayed in the ordered result set according to their respective location annotation. Items identified as exact matches are ordered according to an exact match ordering algorithm. Items assigned a weighted value are displayed in descending order according to weighted value.

Figure 2:
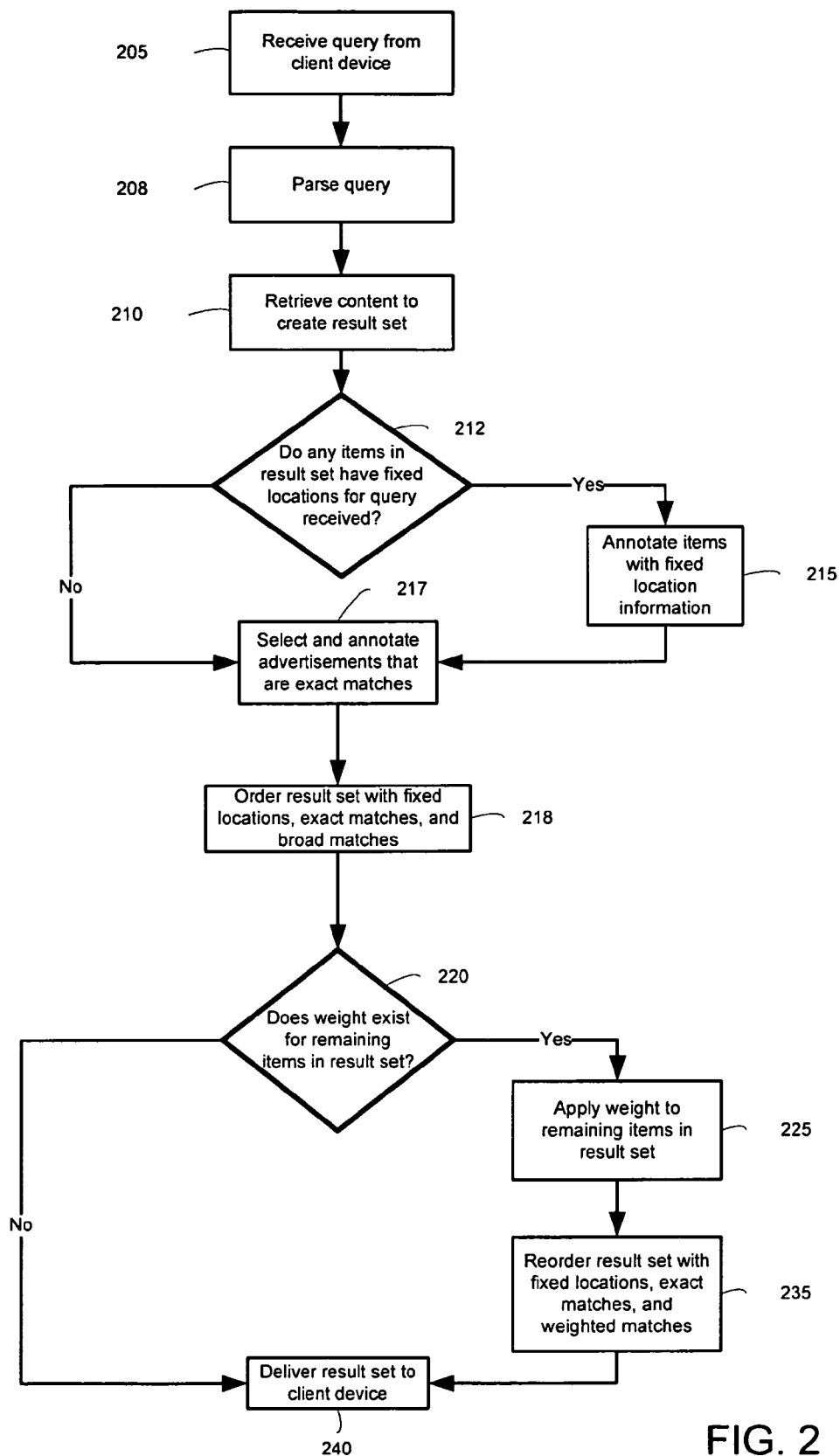
FIG. 2 is a flow diagram presenting a method for retrieving and ordering content in response to query and reordering the content comprising a result set with respect to values and weights.

FIG. 2 presents a flow diagram illustrating one embodiment of a method for reordering items of content in a result set. A search engine receives a query, which comprises one or more terms, from a client device, step 205. The terms comprising a query are parsed, step 208, and used to retrieve content from an index or from one or more content sources, step 210. According to one embodiment, a content manager searches content sources using the parsed query to retrieve relevant content. Content retrieved from content sources may comprise various types of items including images, text files, links, etc. According to another embodiment of the invention, an indexing component searches an index for links to content items. The retrieved content items from a plurality of content sources or indices comprise an unordered result set, step 210. An item retrieved from a content source may have an associated value that, according to one embodiment of the invention, may be a numerical indication of popularity. According to another embodiment of the invention, the value may be an indication of profitability. Those of skill in art recognize numerous types of values that may be associated with an item in a result set.

The unordered content comprising the result set is traversed to determine whether any of the items in the result set are to be placed in fixed locations within the result set, step 212. Accordingly, the present invention allows for the ranking of an item at a fixed location within a result set. For example, a content provider may direct a search engine to display an item of content in the result set in position two of an ordered result set when a specified query is received from a client device. When the result set is generated in response to the user query specified by the content provider, the item in the result set selected by the content provider to appear in position two appears as the second item in the ordered result set displayed to the user of the client device.

The result set corresponding to the query received is traversed to determine whether any content from content providers are to be displayed in fixed positions, step 212. If content to be displayed in fixed positions are located in the result set, the items are annotated as such, step 215. If there are no items of content in the result set to display in fixed positions, no fixed position annotations are made to items of content in the result set. The result set is again traversed to locate items qualifying as "exact matches." Items in the result set that qualify as exact matches are annotated as such, step 217. An exact match may comprise an item that contains the exact terms of the query received. According to one embodiment of the invention, an exact match comprises an item in the result set containing all the elements or terms comprising a given query. According to another embodiment of the invention, an exact match comprises an item in the result set containing the elements or terms comprising a query at least N times. Those of ordinary skill in the art recognize that numerous methods exist for identifying items in a result set that are exact matches in response to a given query.

Items in the result set not annotated with fixed position information or designated as exact matches may be ordered according to a broad match ordering algorithm, step 218. A broad match ordering algorithm provides for an ordering of items in the result set not designated as exact matches or fixed position items. According to one embodiment of the invention, a broad match comprises designating items in the result set as falling within the scope of a given category and ordering the items in the result set with respect to the designated category information. According to another embodiment of the invention, a broad match comprises identifying the geographic location of a client device and content provider of an item in the result set and ordering items in the result set according to their proximity with respect to the client device.

A check is performed to determine whether a weight exists for the query received, step 220. If the check evaluates to false, the ordered result set with fixed position items, exact match items, and broad match items are delivered and displayed to the client device that initiated the query. If the check evaluates to true and a weight is associated with the query received, the weight is used to calculate a weighted value for the one or more items in the result set not identified as exact matches or annotated with fixed position information. The result set is traversed and the weight identified with the given query is used to assign a weighted value to the one or more items in the result set not identified with fixed position information or designated an exact match, step 225. According to one embodiment of the invention, the product of the value associated with each item in the result set and the weight identified is used to create a weighted value. The result set is traversed and a weighted value is assigned to the one or more items in the result set not identified with a fixed location or as an exact match using each item's associated value, step 225.

The items in the result set not identified with fixed position information or designated as exact matches are reordered according to the calculated weighted values, step 235. The reordered result set is delivered to the client device that initiated the query, step 240. The result set delivered to a client device comprises an ordered result set with fixed position items in their respective positions and ordered exact match items. Additionally, the weighted value items in the result set are ordered in descending order according to weighted value.

Figure 3:
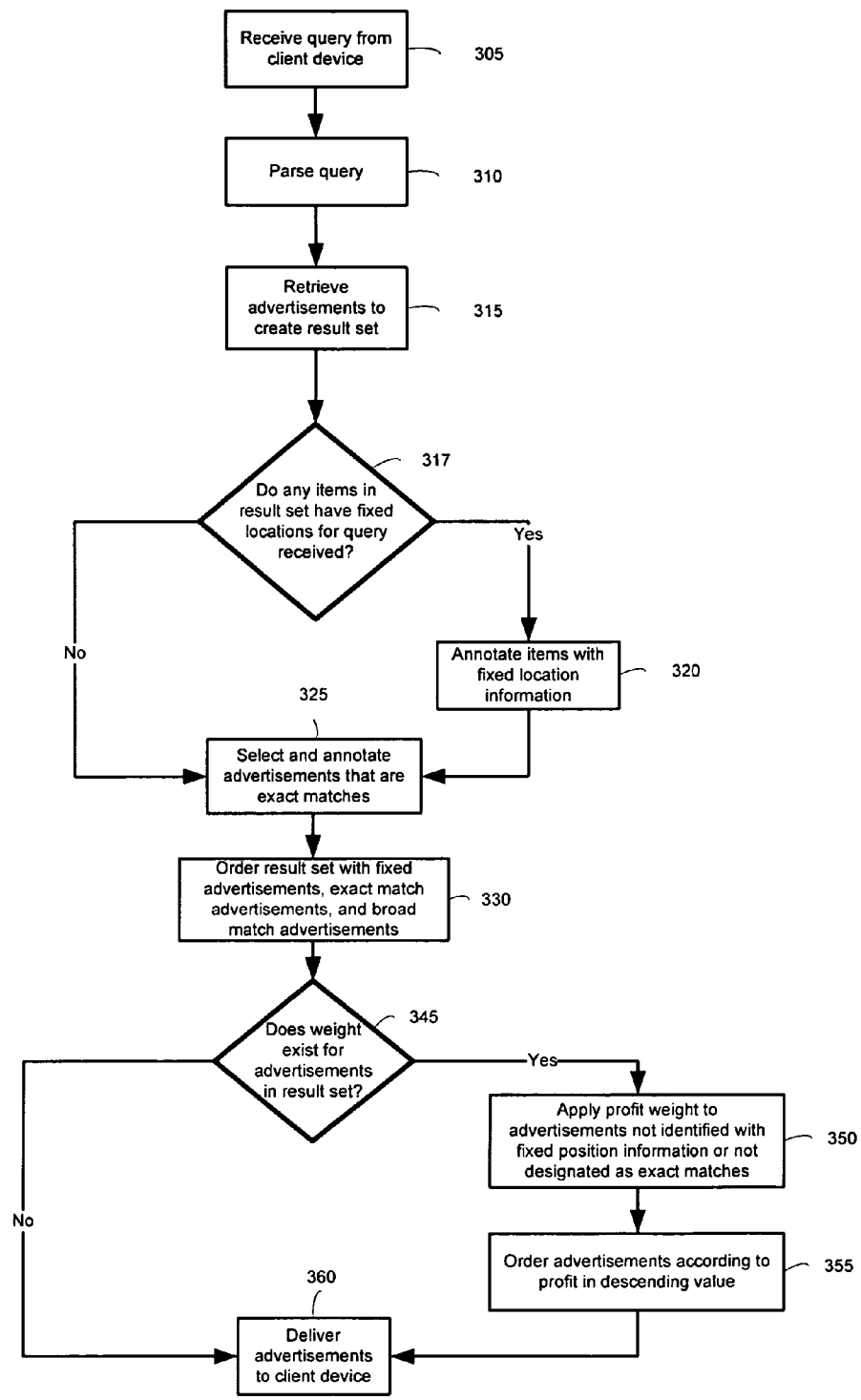
FIG. 3 is a flow diagram presenting a method for retrieving and ordering advertisements in response to a query and reordering the advertisements with respect to profitability.

FIG. 3 presents a flow diagram presenting a method for reordering advertisements in a result set in response to a query received from a client device. A user, communicatively coupled to a network, such as the Internet, may submit a search query. The query is received by a search engine, step 305, and parsed in order to deliver the query to a content manager or indexing component, step 310. According to one embodiment of the invention, the parsed query is used by a content manager to retrieve a plurality of advertisements related to the user's query and generate a result set, step 315. According to another embodiment of the invention, an indexing component uses the parsed query to search an index comprised of links to advertisements to generate a result set. Advertisements comprising a result set may include images, web sites, links, video files, audio files, text, etc.

Each advertisement retrieved from a content source or index has an associated value. According to one embodiment of the invention, the value comprises a numerical indication of the price charged to an advertiser for each user who selects or clicks on the given advertisement. According to another embodiment of the invention, a value comprises an indication of the profit earned by a search engine for displaying a given advertisement. According to yet another embodiment of the invention, a value comprises the price charged to an advertiser when a given advertisement is displayed in a result set. According to yet another embodiment of the invention, a value comprises an indication of the frequency with which an advertisement is selected.

The advertisements retrieved from content sources or indices comprise the initial unordered result set consisting of a plurality of advertisements. An advertiser may select one or more advertisements to be displayed when the search engine receives a given query. Furthermore, an advertiser may specify the location in a result set that an advertisement should appear in response to a given query. For example, an advertiser may specify that upon receiving the query "notebook computer," the search engine is to retrieve a link and summary of the advertiser's web site for notebook computers and position the link and summary as the first result in a result set displayed to the user initiating the query. A search engine may specify the price for displaying the advertisement in a fixed location in a result set for a given query. Offering a fixed location within a result set provides an advertiser with the assurance that the advertiser's advertisement will be displayed in response to a given query.

Associated with each query are information specifying the advertisements to be displayed and their respective fixed positions within a result set. The advertisements comprising an initial unordered result set are traversed to determine which advertisements associated with the received query are to be displayed in fixed positions, step 317. If an advertisement is located within the result set that is to be displayed in a fixed position, the advertisement is selected and annotated to indicate its relative position within the result set returned to the user of the client device initiating the query, step 320.

If there are no advertisements to display in fixed positions, or after all advertisements have been annotated with their respective fixed position location information, the result set is traversed for advertisements that qualify as "exact matches," step 325. An exact match may comprise an advertisement that contains the exact terms of the query received. Exact match advertisements located in a result set are annotated with information identifying them as such, step 325. According to one embodiment of the invention, an exact match comprises an advertisement containing all the terms or elements of a user's query. According to yet another embodiment of the present invention, an exact match comprises an advertisement offering a product or service specified by a user's query. According to yet another embodiment of the invention, an exact match comprises an advertisement containing the terms of a user's query at least N times. Those or ordinary skill in the art recognize numerous methods for identifying an exact match in a result set in response to a given query.

Advertisements in a result set not identified with fixed position information and not designated as exact matches may be ordered according to a broad match ordering algorithm, step 330. A broad match ordering algorithm provides for the ordering of advertisements not designated as exact matches or identified as fixed position items. According to one embodiment of the invention, a broad match ordering algorithm comprises identifying advertisements by product or service category and using the category information to order the advertisements in the result set. According to another embodiment of the invention, a broad match ordering algorithm comprises identifying the geographic location of a user or client device and further identifying the geographic location of the advertiser providing the advertisement in the result set. Using the geographical information, advertisements are ordered according to an advertiser's proximity with respect to the user or client initiating the query.

The method of the present invention may thereafter determine whether the query received has an associated weight, step 345. Each query received may have an associated weight to determine the most profitable ordering for advertisements in a result set. If a query does not have an associated weight, the ordered result set is delivered to the client device or user that initiated the query, step 360. However, if the query received has an associated weight, the result set is traversed to select advertisements that are not designated as exact matches or identified with fixed position information. The value associated with each advertisement not identified as an exact match or as a fixed position item is selected and used in conjunction with the weight to create a weighted value for each advertisement, step 350. According to one embodiment of the invention, the product of the weight and the value associated with the one or more advertisements not identified with fixed position information and not designated as an exact match is used to create a weighted value for each advertisement, step 350.

The weighted values are used to reorder the result set so as to place advertisements with the greatest weighted value before advertisements with a lesser weighted value, thereby increasing the likelihood that a more profitable advertisement is seen and selected by a user, step 355. The reordered result set is delivered to the client device that initiated the query, step 360. A user of the client device may select any of the advertisements displayed.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

I claim:

1. A method for reordering an ordered result set, the method comprising:
   electronically retrieving content comprising a result set corresponding to a search query;
   determining, via the computer, an initial ordering for the result set including a plurality of items;
   determining if any of the items in the result set have a fixed location in the result set, wherein the fixed location is a purchased fixed location;
   for each of the items having a fixed location in the result set, annotating the item as designated for the fixed location;
   electronically retrieving a weight associated with the search query;
   electronically retrieving values associated with one or more content items in the result set;
   producing, via the computer, a weighted value for the one or more content items in the result set by traversing the result set, selecting the values associated with the one or more content items in the result set and calculating the weighted value using the values associated with the one or more content items in the result set and the weight associated with the search query and accounting for the items designated for fixed locations in the result set;
   reordering, via the computer, the result set with respect to the weighted values produced including placing each of the annotated items in the fixed locations; and
   electronically delivering the result set to a client device.

2. The method of claim 1 wherein determining an initial ordering comprises selecting items in the result set which contain the exact terms of the received query.

3. The method of claim 1 wherein a result set comprises a plurality of content items retrieved from content sources.

4. The method of claim 1 wherein retrieving content from content sources comprises using the parsed query to retrieve a plurality of content items.

5. The method of claim 1 wherein retrieving content comprises retrieving advertisements.

6. The method of claim 1 wherein retrieving content items comprises retrieving links to content.

7. The method of claim 1 wherein retrieving content comprises retrieving an item of content and a value associated with the item of content.

8. The method of claim 1 wherein retrieving content comprises retrieving an advertisement and a value associated with the advertisement.

9. The method of claim 1 wherein reordering the result set comprises traversing the result set and ordering items in the result set in descending order based upon each item's weighted value.

10. The method of claim 1 wherein producing a weighted value for the one or more items in the result set comprises computing the product of the weight associated with the query received and the value associated with an item in the result set.

11. A system for reordering an ordered result set, the system comprising:
   a content manager operative to retrieve content from content sources and generate a result set in response to a given query;
   an indexing component operative to retrieve links to content from content sources and generate a result set in response to a given query the result set including a plurality of items, the indexing component being further operative to determine if any of the items in the result set have a fixed location in the result set, wherein the fixed location is a purchased fixed location and for each of the items having a fixed location in the result set, annotating the item as designated for the fixed location;
   one or more content sources operative to store content items and values associated with each content item;
   a weight component operative to retrieve the result set, traverse the result set, select the values associated with the one or more content items in the result set and apply a weight associated with the query received to the values associated with the one or more content items in the result set to generate a weighted value and accounting for the items designated for fixed locations in the result set;
   a reorder component operative to reorder items in the result set according to the weighted values including placing the annotated items in the fixed locations; and
   a client device operative to receive the result set.

12. The system of claim 11 wherein the result set comprises a plurality of content items.

13. The system of claim 12 wherein the plurality of content items comprise advertisements.

14. The system of claim 11 wherein content sources are operative to store a plurality of advertisements.

15. The system of claim 11 wherein content sources are operative to store a plurality of links to advertisements.

16. The system of claim 11 wherein content sources are operative to store values associated with each content item.

17. The system of claim 16 wherein the values associated with items of content comprise numerical indications of profit earned for a given item of content.

18. The system of claim 17 wherein the values associated with items of content comprise numerical indications of profit earned when a user selects a given advertisement.

19. The system of claim 11 wherein the weight component is operative to calculate the product of the value associated with a given content item and the weight associated with a given query to produce a weighted value for the one or more content items in the result set.

20. The result set of claim 11 wherein the reorder component is operative to traverse and reorder the result set in descending order according to the weighted values of the one or more content items.

* * * * *

UNITED STATES PATENT AND TRADEMARK OFFICE
CERTIFICATE OF CORRECTION

PATENT NO. : 7,809,731 B2  Page 1 of 1
APPLICATION NO. : 11/264741
DATED : October 5, 2010
INVENTOR(S) : Robert J. Collins It is certified that error appears in the above-identified patent and that said Letters Patent is hereby corrected as shown below:

Title Page, Item (54) Title:
Title should read --SYSTEM AND METHOD FOR REORDERING A RESULT SET--

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,809,731 B2 | Page 1 of 1 |
| APPLICATION NO. | : 11/264741 | |
| DATED | : October 5, 2010 | |
| INVENTOR(S) | : Robert J. Collins | |

It is certified that error appears in the above-identified patent and that said Letters Patent is hereby corrected as shown below:

Title Page, Item (54) and at Column 1, lines 1 and 2, Title:
    Title should read --SYSTEM AND METHOD FOR REORDERING A RESULT SET--

This certificate supersedes the Certificate of Correction issued December 14, 2010.

Signed and Sealed this

Fourth Day of January, 2011

David J. Kappos
*Director of the United States Patent and Trademark Office*